(12) United States Patent
Vieira

(10) Patent No.: US 10,288,830 B2
(45) Date of Patent: May 14, 2019

(54) EXPANDABLE OPTICAL DISTRIBUTION DEVICE

(71) Applicant: FURUKAWA ELECTRIC LATAM S.A., Curitiba (BR)

(72) Inventor: Thiago Deconto Vieira, Curitiba (BR)

(73) Assignee: FURUKAWA ELECTRIC LATAM S.A., Curitiba (BR)

( * ) Notice: Subject to any disclaimer, the term of this patent is extended or adjusted under 35 U.S.C. 154(b) by 0 days.

(21) Appl. No.: 15/938,678

(22) Filed: Mar. 28, 2018

(65) Prior Publication Data

US 2018/0284380 A1 Oct. 4, 2018

(30) Foreign Application Priority Data

Mar. 28, 2017 (BR) .............................. 102017006316

(51) Int. Cl.
*G02B 6/44* (2006.01)
*G02B 6/46* (2006.01)

(52) U.S. Cl.
CPC ......... *G02B 6/4454* (2013.01); *G02B 6/4457* (2013.01); *G02B 6/4471* (2013.01); *G02B 6/46* (2013.01)

(58) Field of Classification Search
CPC ....... G02B 6/4454; G02B 6/4457; G02B 6/46
See application file for complete search history.

(56) References Cited

U.S. PATENT DOCUMENTS

2015/0355428 A1* 12/2015 Leeman ............... G02B 6/4454
385/135
2016/0238810 A1* 8/2016 Hubbard .............. G02B 6/4457

FOREIGN PATENT DOCUMENTS

WO WO-2015/158121 10/2015

* cited by examiner

*Primary Examiner* — Omar R Rojas
(74) *Attorney, Agent, or Firm* — B. Aaron Schulman, Esq.; Stites & Harbison, PLLC.

(57) ABSTRACT

An expandable optical distribution device is provided which includes a basic module defined by a basic box, closed by a front cover, receiving an optical cable and housing an optical fiber derived from the optical cable and coupled to an output adapter to which a user's drop cable of a first user is coupled; and an additional carton-shaped expansion module in the form of an additional box, engageable on the basic box and closed by a tilting cover. The additional box is provided with an input connector attachable to the output adapter, and houses an expansion fiber split into multiple user fibers, each user fiber being coupled to an expansion adapter internal to the additional box and to each of which a user's drop cable is attachable.

17 Claims, 11 Drawing Sheets

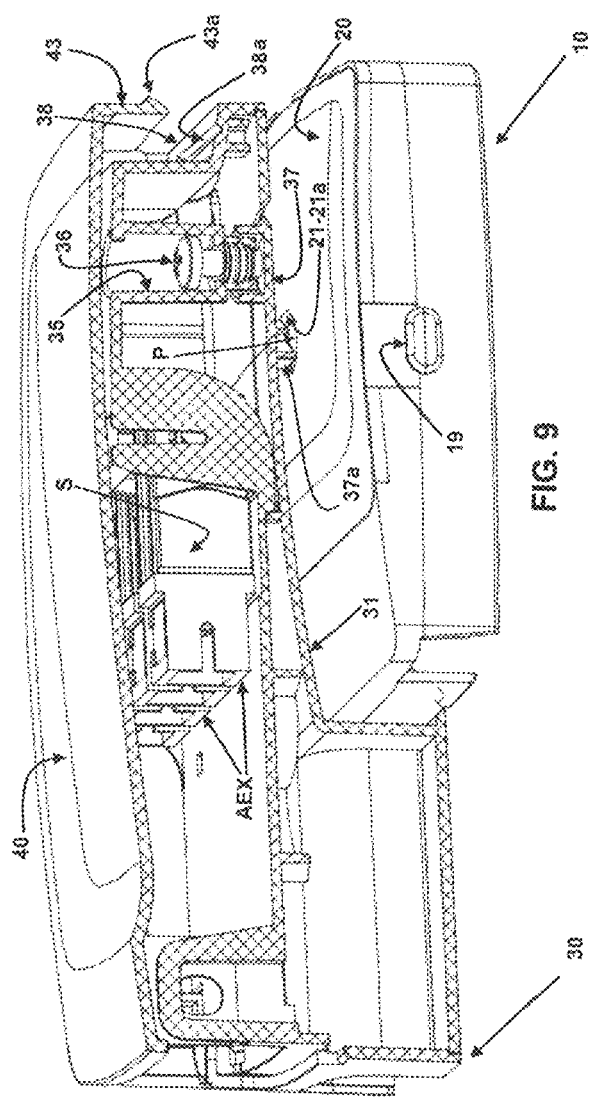

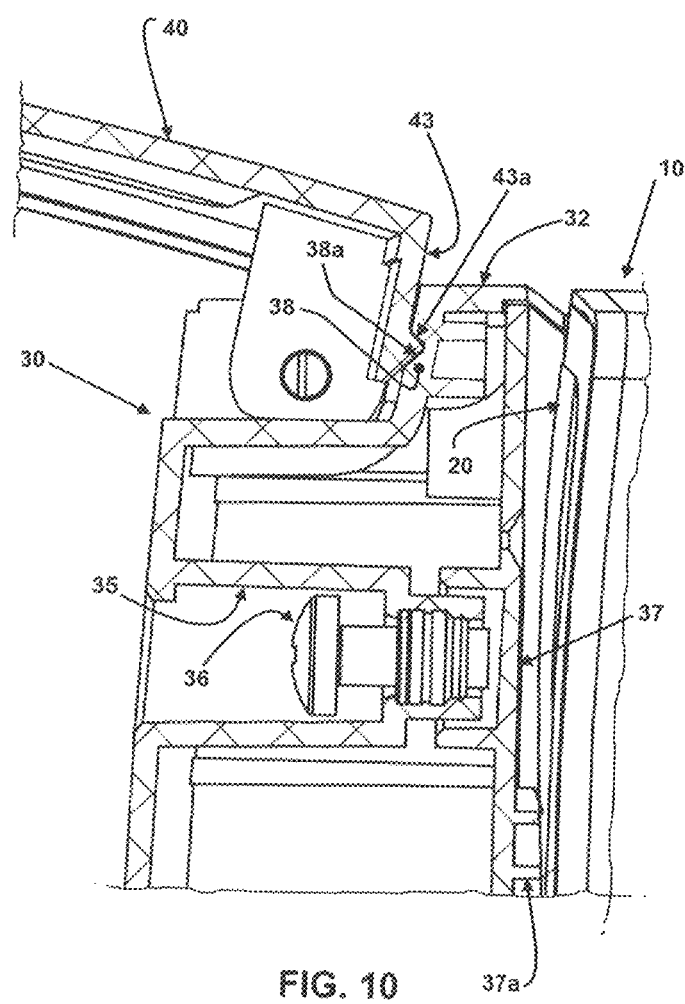

EXPANDABLE OPTICAL DISTRIBUTION DEVICE

FIELD OF THE INVENTION

This invention relates to an optical fiber distribution device from a multi-fiber line cable, assembled within a building and having a modular construction, to allow the initial installation with low investment, for service to a first user in said building, and an easy and quick gradual expansion of the ability to connect to additional drop cables for new users in the building, without requiring disassembly, constructive modifications and even access to the interior of the initial installation of service to the first user.

BACKGROUND OF THE INVENTION

With the popularization of optical fiber services arriving at the user's home (types of network called FTTH—Fiber to the Home) and the potential of subscribing customers of such services, it has been revealed the need to reduce the time spent in each user activation, mainly due to the operational difficulties associated with the shortage of work-qualified labor and the need for appropriate equipment for more complex installations.

For the aforementioned factors, technical solutions for customer-user activation are now desirable, and even required, that enable a quick, intuitive and secure installation. These factors make it inappropriate to use boxes with very simple internal architecture and prone to generate problems when their interior has to be accessed several times to connect drop cables of new subscribers that will be gradually activated from the same optical distribution box.

Thus, although they are related to a relatively small initial investment due to their constructive simplification, these optical distribution boxes, with simple internal architecture, have the drawback of not allowing an easy, fast and secure gradual expansion of the drop cables to be subsequently connected to it.

In order to overcome the problem of the excessive simplification of the construction of the junction boxes, FTTH internal network installations are often oversized at the outset, providing for the future increase in the number of internal network users in a given building. It turns out that this strategy generates an initial investment greater than that which would be necessary to meet the needs of a first user only.

In such installations of an optical fiber network within a building, a distribution box is used in which an optical cable containing a plurality of optical fibers is generally received and capable of servicing the users of the building, even though only part or even only one of these users has to be serviced initially.

The distribution box considered herein is used to provide for the separation of an optical fiber from the optical cable line, so that the optical fiber is then routed to the residence of a user in the building, by means of an optical fiber extension known as a FTTH (Fiber To The Home).

Due to the fact that the initial installation of said distribution box is, in many cases, addressed to the service of only one user, different constructive solutions have been proposed to provide a box or optical distribution device, which allows a progressive expansion of drop cables (user cables) that have been split from the same fiber separate from the optical cable line inside the distribution box.

Examples of distribution boxes or devices of the type contemplated herein may be seen in the documents US 2015/0355428 A1 and WO 2015/158121 A1, which describe solutions in which the device is formed in one or more boxes or parts, provided with elements for receiving the optical cable line, its retention and its derivation into an optical fiber to be divided and associated with a plurality of output adapters arranged to each receive a respective connector of a drop cable passed to a corresponding user in the building.

In spite of allowing the progressive connection of different users of the building, these previous constructions are formed, initially, with all elements capable of meeting the potential of users to be gradually activated, at different times, from a distribution device in a given building.

Thus, the known optical distribution devices do not facilitate the activation of a new user without the possibility of incurring disconnections and failures in already activated points, as well as the possibility of using drop cables with different sections of the cable and without the use of tools to anchor them.

SUMMARY OF INVENTION

In view of the aspects discussed above, this invention is aimed to provide an optical fiber distribution device from a line cable, within a building and having a construction that allows an initial installation with low investment costs, for a first user, and an easy, fast and secure gradual expansion of the distribution capacity of additional drop cables for new users without requiring disassembly, constructive modifications and even access to the interior of the installation to the first user.

According to the invention, the optical distribution device in question comprises, using non-electrically conductive material:

a basic module comprising a basic box housing, closed by a front cover and provided with an input and an output for an optical line cable and a connection opening. The basic box houses an optical fiber extension derived from the optical cable and a fiber extension having an end spliced to the optical fiber and a free end coupled to an output adapter engaged in the connection opening and in which a drop cable of a first user is selectively engageable; and an expansion module comprising an additional box housing, engageable on the basic box, closed by a tilting cover and provided with an input connector coupled to the basic box outlet adapter.

The solution described briefly above allows a simplified initial installation to meet a first user, and a rapid and secure gradual increase in the number of users, without requiring disassembly, constructive modifications and even access to the interior of the initial service installation to the first user.

BRIEF DESCRIPTION OF THE DRAWINGS

The additional box housing is fitted over the basic box, said additional box having therein, an expansion fiber, having one end coupled to the input connector and an opposing end coupled to a splitter device in which the expansion fiber is divided into multiple user fibers, each of the latter having one end coupled to an optical connector connected to an internal expansion adapter of the additional housing located behind the tilting cover and to each of which a user's drop cable is selectively engageable.

FIG. 9 is a side perspective view of the optical distribution device but with the expansion module sectioned to illustrate its locking on the basic module when in the fully engaged position.

FIG. 10 shows an enlarged cross-sectional detail of the hinge region of the expansion module front cover.

DETAILED DESCRIPTION OF THE INVENTION

Figure 1:
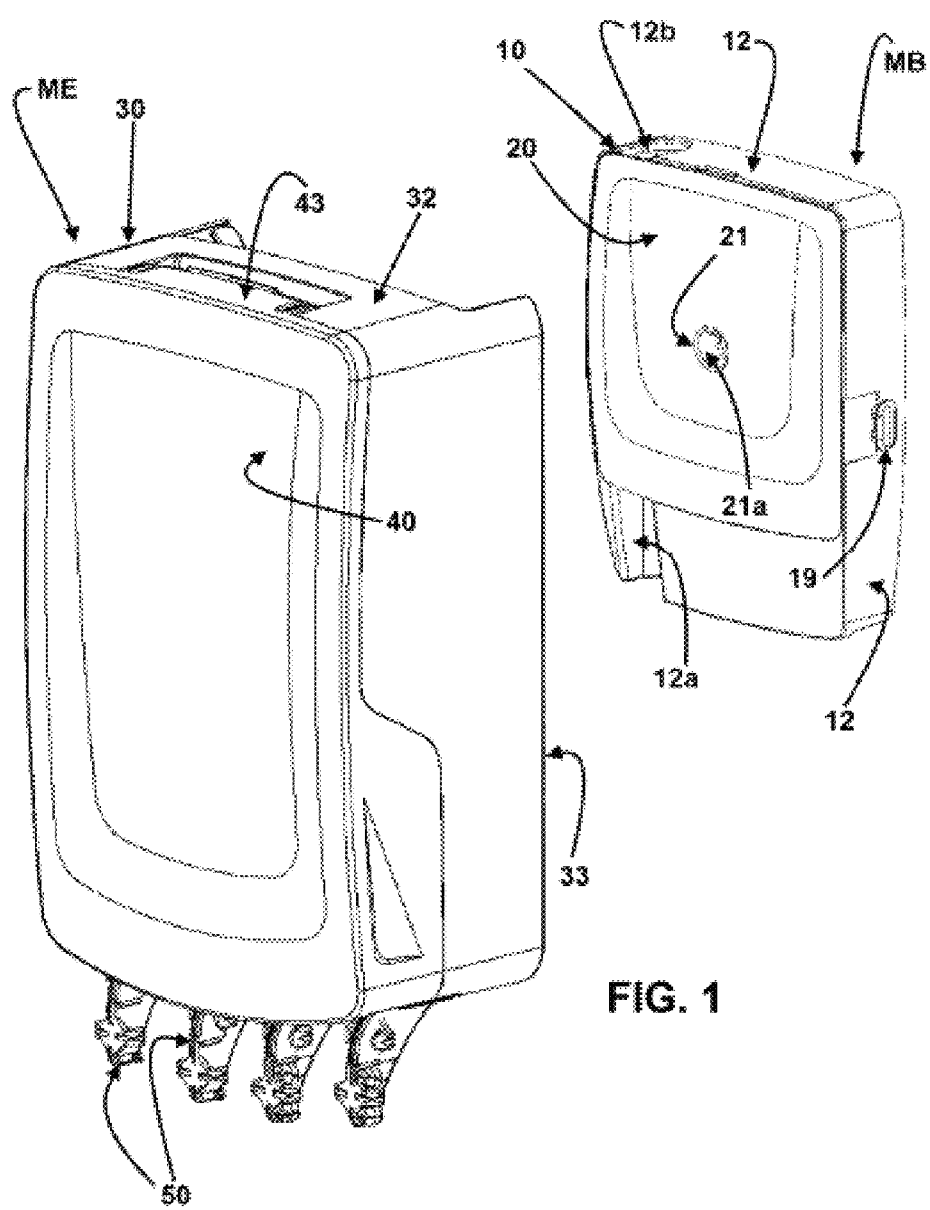
FIG. 1 is a front exploded perspective view of the basic and expansion modules of the optical distribution device with their respective covers in the closed position.

As shown in the drawings, the optical distribution device in question comprises a basic module MB and an expansion module ME, both in electrical non-conductive material, for example in polymer.

The basic module MB comprises a square box 10, having rounded corners and defined by a bottom wall 11 and side wall portions 12, one of which is provided with an input 12a for an optical cable CO, while an opposing side wall portion is provided with an output 12b for said optical cable CO.

The input 12a and the output 12b of the basic box 10 are associated with respective clamps 13a, 13b to provide for the anchoring of the outer cover of the optical cable CO which is received within the basic module MB.

Figure 2:
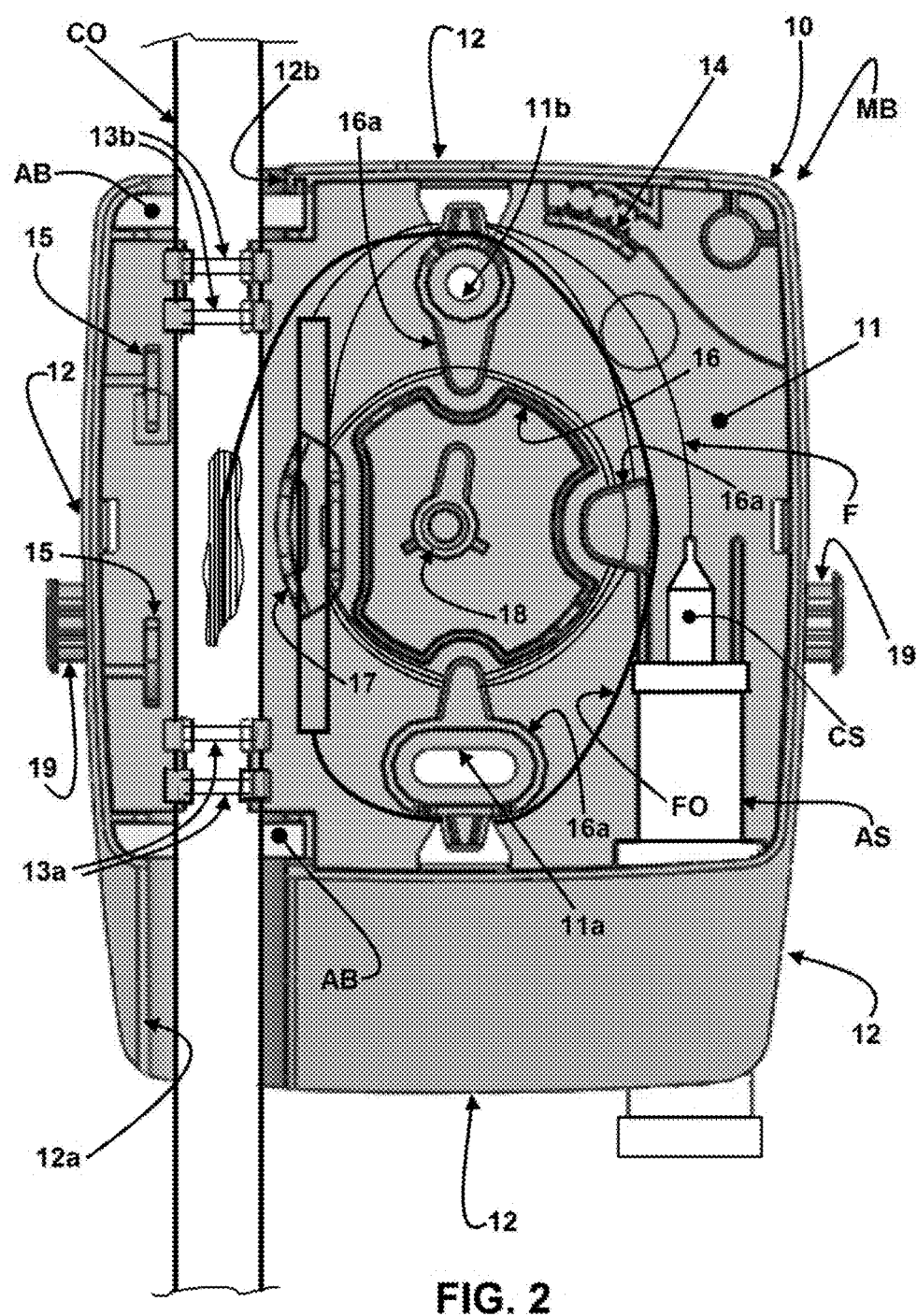
FIG. 2 shows a front view of the basic module devoid of its front cover and illustrating the optical cable, the optical fiber derived therefrom and spliced to a fiber extension coupled to an output adapter in which is externally coupled to the drop cable.

The basic box 10 incorporates in its interior, an anchor cable 14, low friction type, an anchor line 15 to the pulling elements of the optical cable CO, a central reel 16 to the fiber optic FO winding derived from the optical cable CO inside the basic box 10 (see FIG. 2), a plurality of winding guides 16a, peripherally associated with the central reel 16, a support 17 to receive an optical fiber FO splice protector (removal of the optical cable CO) with an extension of fiber F (pigtail) to be wound around the central reel 16, and have its free end coupled by a suitable output connector CS to an output adapter, which is coupled in a connection opening 12c provided in the side wall portion 12, which carries the input 12a to the optical cable CO.

The above-described construction for the basic module MB allows it to be provided in an internal installation of a building, to serve a first user only. For such purpose, it is sufficient for an end connector (not shown) of a drop cable of said first user to be coupled to the output adapter AS of the basic box 10 of the basic module MB.

The basic box 10 may further be provided with a rubber ring AB at the output 12b and even at its input 12a, for protection of the outgoing portions of the optical cable CO.

The basic module MB further comprises a front cover 20, with the same square contour having rounded corners, to be seated on a free leading edge of the side wall portions 12. The front cover 20 is attached to the basic box 10 by a screw (not shown), inserted into a central hole 21 of the front cover 20, the central hole 21 being surrounded by an enlarged recess 21a for receiving the head of the screw whose body is engaged within a tubular projection 18 of the bottom wall 11 of the basic box 10.

The bottom wall 11 is provided with holes 11a, 11b for passing the fixing screws (not shown) of the basic module MB to any support surface of a building.

The fact that the basic box 10 and its front cover 20 have the same square contour allows the front cover 20 to be mounted and secured in any of four angularly offset positions to each other by 90 degrees on a free leading edge of the side wall portions 12. This allows the front cover 20 to be always maintained in the correct position for reading of the inscriptions usually applied therein and related to the technical characteristics of the basic module MB, even if the basic box 10 has to be mounted in positions rotated through 90°, 180° and 270° relative to the position shown in the drawing figures, so that the input 12a and the output 12b of the basic box 10 are arranged in the same alignment of the optical cable line CO.

The basic box 10 has two side wall portions 12, opposite each other and distinct from those provided with the input 12a and the output 12b, each externally incorporating a guide pin 19, approximately "T" shaped, and whose function will be described later.

After the basic module MB has been installed and the connection (not shown) has been activated to a first user, it may be required to expand the number of users to be simultaneously or gradually connected to the same optical distribution device. In this case the provision of the expansion module ME is required which, in the illustrated construction, allows the fiber extension F, which feeds the output adapter AS of the basic module MB, to be divided, for example, into eight fibers to serve eight different users to be gradually connected to the distribution device.

In the illustrated construction, the expansion module ME comprises an additional box 30, previously open and having a bottom wall 31 that previously incorporates side wall portions 32 and later in part from its extension from an upper edge, a pair of side flaps 33, parallel to each other and dimensioned and configured to be slidably and fairly fitted externally to the side wall portions 12 of the basic box 10, each provided with the aforementioned guide pin 19.

Each guide pin 19 is engaged in a slot 33a provided internally along part of a respective side flap 33, allowing the engagement between the two boxes to be precisely made.

Each slot 33a has an open and wide input end for a longitudinal edge of the respective side flap 33, allowing the expansion module ME to be initially seated on the basic module MB, with the two guide pins 19 of the latter being engaged at the open ends of the slots 33a. Thereafter, the expansion module ME is moved over the basic module MB, causing the two guide pins 19 to slide along the slots 33a until the full engagement position between the two boxes 10 and 30 is achieved.

Figure 6:
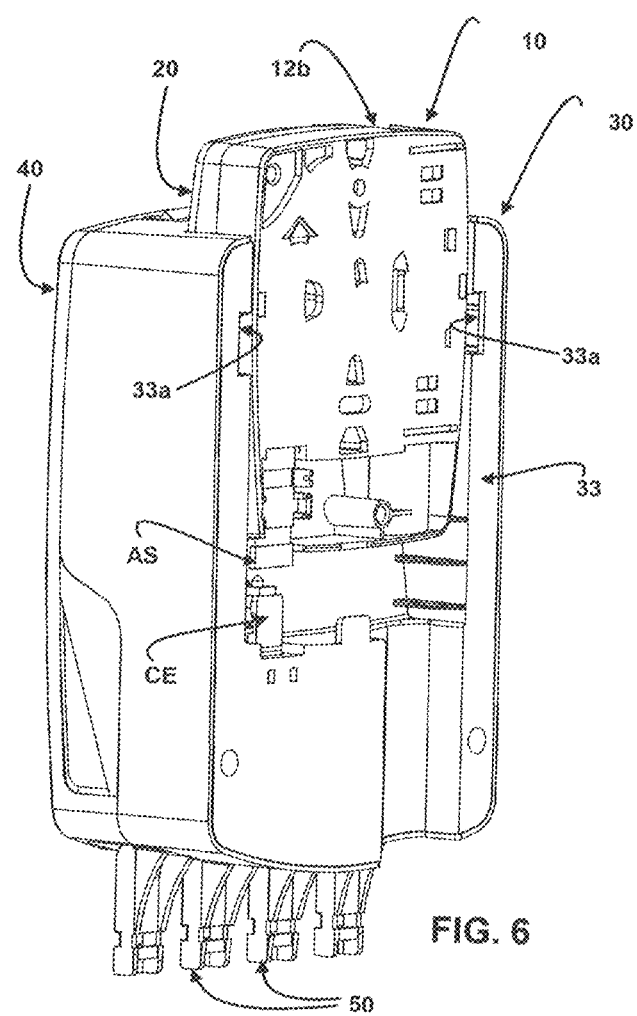
FIG. 6 is a rear perspective view of the optical distribution device, with the expansion module seated on the basic module, before being slid into the fully engaged position.
Figure 7:
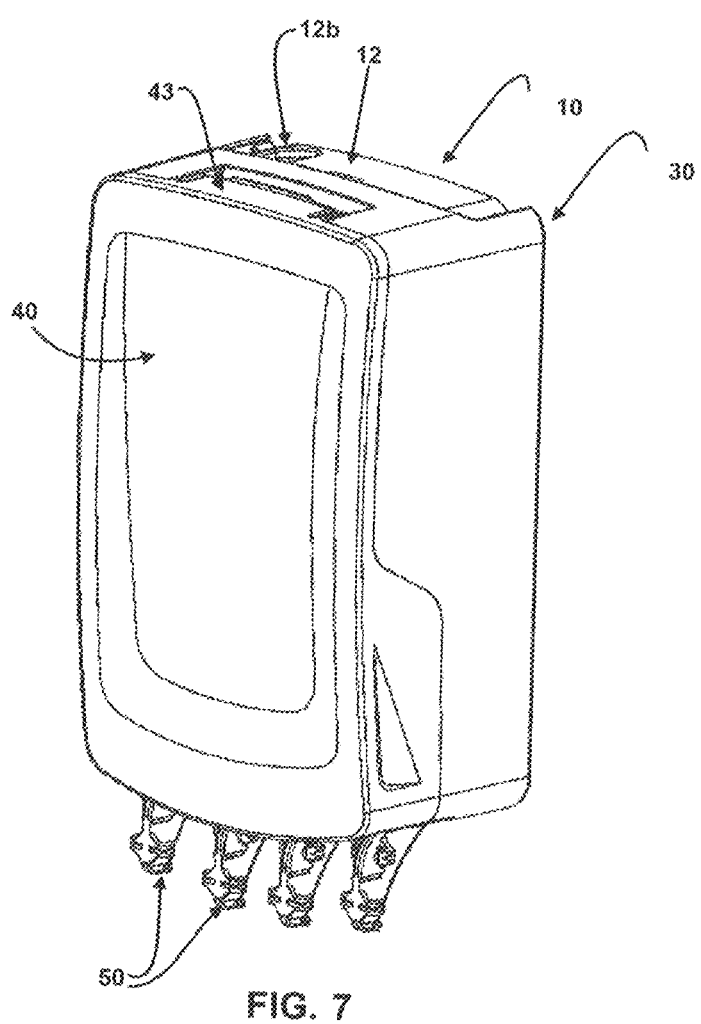
FIG. 7 is a front perspective view of the optical distribution device, with the expansion module fully engaged on the basic module.
Figure 8:
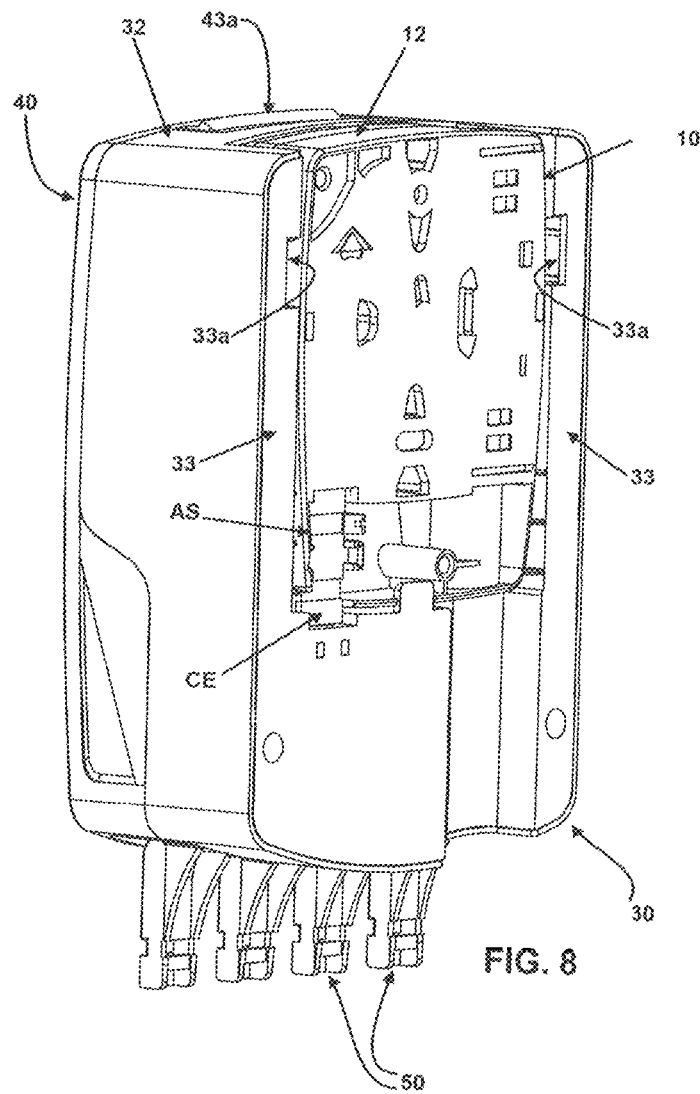
FIG. 8 is a rear perspective view of the optical distribution device, with the expansion module fully engaged on the basic module.

A lower portion of the additional box 30, devoid of the side flaps 33, has a greater depth, with the bottom wall 31 forming a step 34 facing the region inside the side flaps 33 and in which an input connector CE arranged so as to be coupled to the outlet adapter AS of the basic box 10, upon the complete engagement of the additional box 30 on the basic box 10, as shown in FIGS. 6 and 8.

The locking system between the two boxes ensures the alignment between the AS output adapter of the basic box 10 and the input connector CE of the additional box 30, causing the connection between these two elements to occur without any risk of the front face of the outlet adapter AS of the basic box 10 bumping into some other part of the additional box 30 before completion of the engagement of one box into the other.

The interior of the additional box 30 is dimensioned and configured to receive and house an expansion fiber FE having one end coupled to the input connector CE and an opposing end coupled to a splitter device D, in which the expansion fiber FE is divided into multiple user fibers FU. In the illustrated example there are provided eight user fibers FU, each having one end coupled, by means of an expansion connector (not shown) to an expansion adapter AEX facing the inside of the additional box 30, to receive coupling of a respective plug connector (not shown) from a drop cable (not shown) for activation of a user.

One of the expansion adapters AEX is used to connect the drop cable of the first user who was using the direct connection with the output adapter AS of the basic module MB.

The interior of the additional box 30 is suitably provided with elements, already known in the state of the art, to allow accommodation of the expandable optical expansion fibers FE and user fiber extensions FU.

As best shown in FIG. 9, the additional box 30 is provided with a through tubular housing 35 internally threaded in at least part of its extension and into which is housed a screw 36 which, when rotated clockwise, presses a latch 37, cut into the bottom wall of the additional box 30 forcing it to deform elastically outwardly so that an outer projection 37a, incorporated therein penetrates the enlarged recess 21a of the central hole 21 of the front cover 20 of the basic box 10, promoting the locking of the additional box 30 in its fully engaged position on the basic box 10, in which the input connector CE of the additional box 30 is coupled to the output adapter AS of the basic box 10.

The additional box 30 is closed by a tilting cover 40, which is hingedly connected at its upper end to an upper side wall portion 32 of the additional box 30 so as to be displaceable between a closed position, seated against the additional box 30, and an open and raised position. By exposing the expansion adapters AEX and allowing an operator to lift the tilting cover 40 by holding it in an open position so that they can access one or more of the expansion adapters AEX and thereby activate through the expansion module ME, not only that first user who was previously connected to the basic module MB, but also one or more additional users may be connected, without having to make any access or modification to the basic module MB that remains previously closed by its front cover 20 or within the region of the additional box 30 in which the expansion fiber FE and the user fiber FU, provided by the splitter D and connected to the expansion adapters AEX are located.

Figure 3:
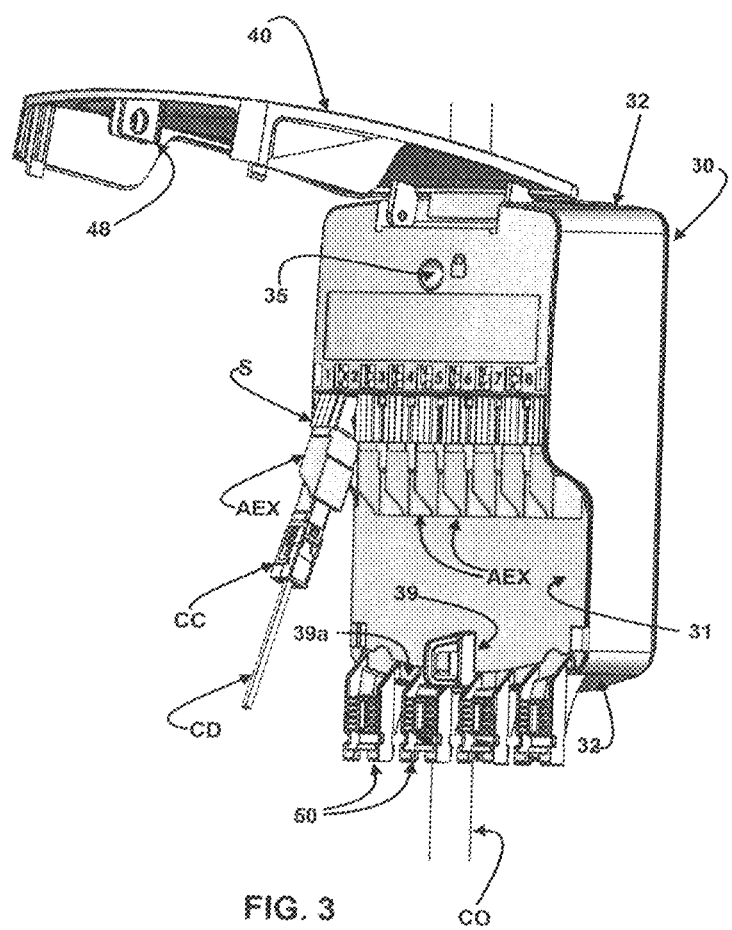
FIG. 3 is a front perspective view of the expansion module with the tilting cover in a fully open position, showing the expansion adapters with one of them pivoted forwardly to facilitate coupling to a connector of a respective drop cable.
Figure 3A:
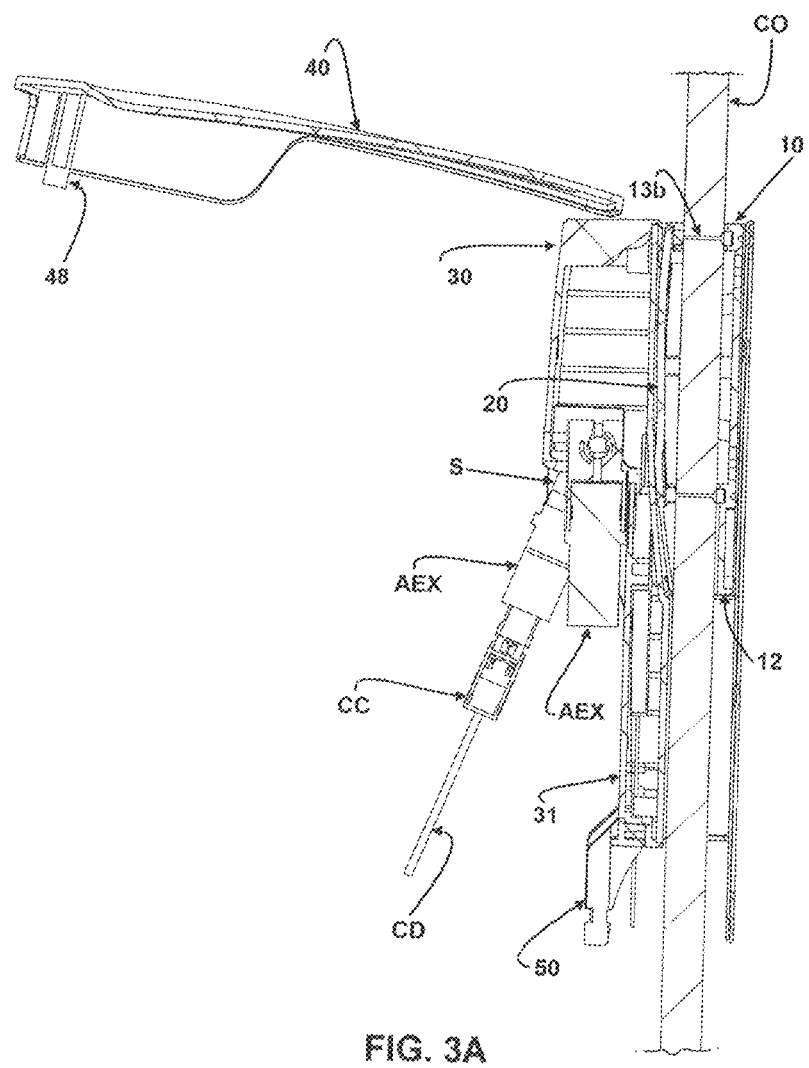
FIG. 3A is a side cross-sectional view of the module of FIG. 3.
Figure 4:
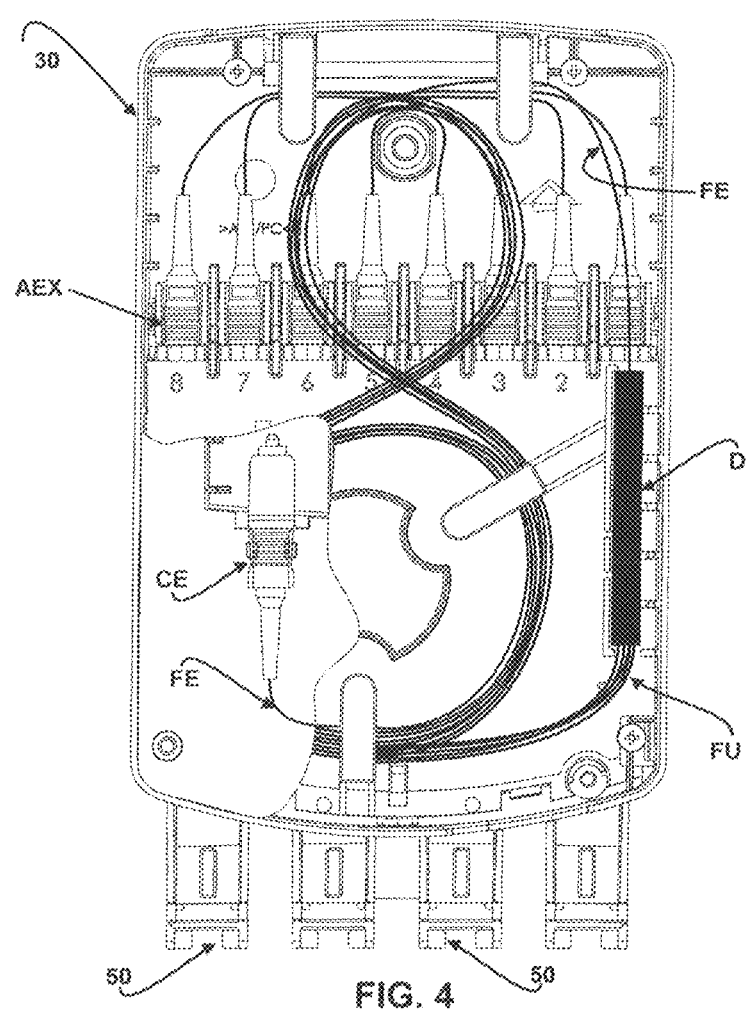
FIG. 4 is a front view of the expansion module devoid of the tilting cover, showing an internal partition wall and the internal accommodation of the expansion fiber, user fibers and expansion adapters.
Figure 5:
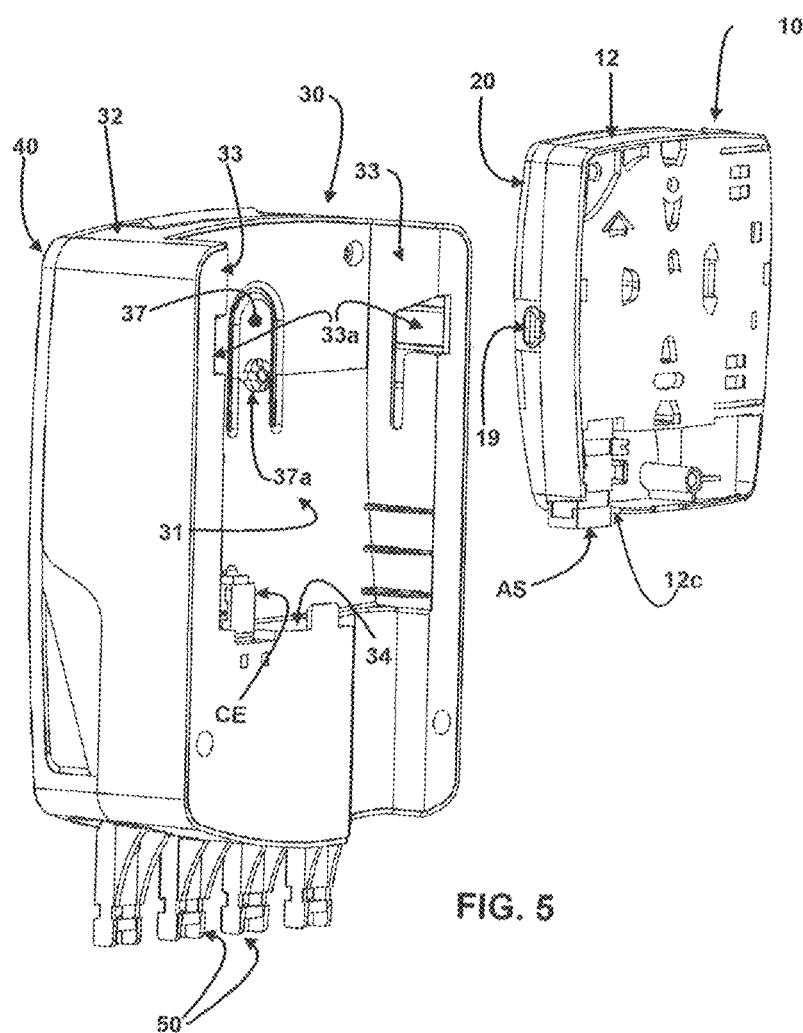
FIG. 5 is a rear exploded perspective view of the basic and expansion modules of the optical distribution device with their respective covers in the closed position.

For convenience of the operator and as shown in FIG. 1, the tilting cover 40 incorporates an end flap 43 facing the additional box 30 and incorporating an outer tooth 43a, which is engaged by slight elastic deformation of the end flap 43, into a recess 38a provided in a confronting wall portion 38 of the additional box 30. Thereby, the tilting cover 40 remains stabilized in its fully open position, allowing the operator to simply and rapidly perform the gradual activation of different users, without requiring any special tools for the user activation operation. For such purpose, the expansion adapters AEX are each mounted on a respective support S, pivoted to the additional box 30, so as to be selectively and manually moved between a collapsed position in which it remains parallel to the bottom wall 31 of the additional box 30, and an assembly position, in which it is pivoted forwardly, to facilitate the coupling of a respective cable connector CC of a user's drop cable CD, as shown in FIGS. 3 and 3A.

The tilting cover 40 always remains attached to the additional box 30 in any operative position, which is an important operational aspect because such a distribution device is often installed in building distribution cabinets, called a shaft, in which there is a risk of loose parts in the cabinet during operations on the device. The tilting cover 40 is further provided with a handle 48 which cooperates, in the closed position, with locking element 39 that is previously incorporated in the additional box 30, allowing the use of security seal or padlock, in order to prevent unauthorized access to the interior of the distribution device.

The additional box 30 of the expansion module ME may be provided with a system for securing an anchor module 50 to the different drop cables CD, said anchor module 50 being engageable in two grooves 39a, T-shaped, provided in the lower part of the additional box 30. The fact that the anchoring module 50 is removable allows its easy replacement by anchoring modules designed according to the type of drop cable to be anchored.

While only one configuration of the expandable optical expansion device in question has been illustrated herein, it should be understood that changes in shape and arrangement of the components may be made without departing from the constructive concept defined in the claims accompanying the invention of this report.

It should be understood that the preferred embodiments mentioned herein are merely illustrative of the present invention. Numerous variations in design and use of the present invention may be contemplated in view of the following claims without straying from the intended scope and field of the invention herein disclosed.

The invention claimed is:

1. An expandable optical distribution device, comprising:
  (1) a basic module (MB), comprising a basic box (10), closed by a front cover (20), and provided with an input (12a) and an output (12b) for an optical cable line (CO) and a connection opening (12c), the basic box (10) housing, on an interior, an optical fiber (FO) extension derived from the optical cable (CO) and a fiber (F) extension having an end spliced to the optical fiber (FO), the fiber extension also having a free end coupled to an output adapter (AS) engaged with the connection opening (12c) and to which a drop cable of a first user is selectively coupled; and
  (2) an expansion module (ME) comprising an additional box (30), engageable with the basic box (10), closed by a tilting cover (40) and provided with an input connector (CE) attachable to the outlet adapter (AS) of the basic box (10) upon engagement of the additional box (30) with the basic box (10), the additional box (30) housing, on an interior, an expansion fiber (FE) having an end coupled to the input connector (CE) and an opposing end coupled to a splitter device (D) within which the expansion fiber (FE) is split into a multiplicity of user fibers (FU), each of the user fibers having an end coupled to corresponding expansion adapter (AEX) of the additional box (30), the expansion fibers located behind the tilting cover (40), and within each expansion adaptor is selectively coupled a user's drop cable (CD);

wherein the basic box (10) having a bottom wall (11) and side wall portions (12), one of the side wall portions having the input (12a) for the optical cable (CO), and an opposing side wall portion (12) having the output (12b) for the optical cable (CO); and wherein the additional box (30) further comprises a bottom wall (31), attached to side wall portions (32) and also having, extending from an upper edge downwardly, a pair of side flaps (33), the side flaps parallel to each other and dimensioned and configured to be slidably fitted externally to two side wall portions (12) of the basic box (10) located opposite each other.

2. The device according to claim 1, wherein the input (12a) and the output (12b) of the basic box (10) are each associated with respective clamps (13a, 13b) for anchoring the optical cable (CO) into the basic module (MB).

3. The device according to claim 1, wherein the basic box (10) further comprises within an interior:
- a low friction cable anchor (14),
- an anchoring support (15) for pulling elements of the optical cable (CO),
- a central reel (16) for winding the optical fiber (FO) derived from the optical cable (CO),
- a plurality of winding guides (16a) peripherally associated with the central reel (16), and
- a support (17) for receiving an optical fiber splicing protector taken from the optical cable (CO), having a fiber extension (F) wound around the central reel (16).

4. The device according to claim 1, wherein the basic box (10) further comprises a rubber ring (AB) located at the output (12b) and a rubber ring located at the input (12a), surrounding and protecting corresponding sections of the optical cable (CO).

5. The device according to claim 1, wherein the basic box (10) has a square shape with rounded corners, the front cover (20) having a corresponding square contour with rounded corners, and the front cover being seated and fixed on a free leading edge of the side wall portions (12) in four positions angularly offset from each other by 90 degrees.

6. The device according to claim 1, wherein the front cover (20) further comprises a central hole (21) surrounded by an enlarged recess (21a), and wherein the attachment of the front cover (20) to the basic box (10) occurring by a screw (P) the screw head received within the enlarged recess (21a) and the screw body engaged within a tubular projection (18) of the bottom wall (11) of the basic box (10).

7. The device according to claim 1, wherein the basic box (10) has two side wall portions (12), located opposite each other and corresponding to the side flaps (33), each side wall portion externally having a guide pin (19) for engagement with a slot (33a) internally provided along a part of the corresponding side flap (33) of the additional box (30).

8. The device according to claim 1, wherein a lower portion of the additional box (30) is devoid of the side flaps (33) and has a greater depth, with the bottom wall (31) forming a step (34) facing a region inside the side flaps (33), upon which the input connector (CE) to be coupled to the output adapter (AS) of the basic box (10) is fixed when the additional box (30) is fully engaged with the basic box (10).

9. The device according to claim 1, wherein the additional box (30) has a tubular housing (35), internally threaded through at least a portion of its extension, and has an inside housing a pressing screw (36) for a latch (37), the latch cut into the bottom wall (31) of the additional box (30) and incorporates an outer projection (37a) to be engaged in an enlarged recess (21a) of a central hole (21) of the front cover (20) of the basic box (10) by locking the additional box (30) in its fully engaged position on the basic box (10), in which position the input connector (CE) of the additional box (30) is coupled to the output adapter (AS) of the basic box (10).

10. The device according to claim 1, wherein the tilting cover (40) is hinged upwardly into an upper side wall portion (32) of the additional box (30) and is movable between a closed position, seated against the additional box (30), and an open and raised position, exposing the expansion adapters (AEX).

11. The device according to claim 10, wherein the tilting cover (40) has an end flap (43) facing the additional box (30) having an outer tooth (43a) engageable within a recess (38a) provided in an opposite wall portion (38) of the additional box (30), the outer tooth retaining the tilting cover (40) in its fully open position.

12. The device according to claim 11, wherein the tilting cover (40) further comprises a handle (48) which cooperates in a closed position with a locking element (39) incorporated into the additional box (30).

13. The device according to claim 1, wherein the additional box (30) further comprises a drop cable anchor module (50), engageable with two grooves (39a) provided in a lower part of the additional box (30).

14. The device according to claim 1, wherein the expansion adapters (AEX) are each assembled on a corresponding support (S), pivoted upon the additional box (30), so as to be selectively and manually moveable between a collapsed position and an assembly position, the assembly position pivoted forwardly for coupling a respective cable connector (CC) of a user's drop cable (CD).

15. An expandable optical distribution device, comprising:
(1) a basic module (MB), comprising a basic box (10), closed by a front cover (20), and provided with an input (12a) and an output (12b) for an optical cable line (CO) and a connection opening (12c), the basic box (10) housing, on an interior, an optical fiber (FO) extension derived from the optical cable (CO) and a fiber (F) extension having an end spliced to the optical fiber (FO), the fiber extension also having a free end coupled to an output adapter (AS) engaged with the connection opening (12c) and to which a drop cable of a first user is selectively coupled; and
(2) an expansion module (ME) comprising an additional box (30), engageable with the basic box (10), closed by a tilting cover (40) and provided with an input connector (CE) attachable to the outlet adapter (AS) of the basic box (10) upon engagement of the additional box (30) with the basic box (10), the additional box (30) housing, on an interior, an expansion fiber (FE) having an end coupled to the input connector (CE) and an opposing end coupled to a splitter device (D) within which the expansion fiber (FE) is split into a multiplicity of user fibers (FU), each of the user fibers having an end coupled to corresponding expansion adapter (AEX) of the additional box (30), the expansion fibers located behind the tilting cover (40), and within each expansion adaptor is selectively coupled a user's drop cable (CD);

wherein the tilting cover (40) is hinged upwardly into an upper side wall portion (32) of the additional box (30) and is movable between a closed position, seated against the additional box (30), and an open and raised position, exposing the expansion adapters (AEX).

16. An expandable optical distribution device, comprising:
- (1) a basic module (MB), comprising a basic box (10), closed by a front cover (20), and provided with an input (12a) and an output (12b) for an optical cable line (CO) and a connection opening (12c), the basic box (10) housing, on an interior, an optical fiber (FO) extension derived from the optical cable (CO) and a fiber (F) extension having an end spliced to the optical fiber (FO), the fiber extension also having a free end coupled to an output adapter (AS) engaged with the connection opening (12c) and to which a drop cable of a first user is selectively coupled; and
- (2) an expansion module (ME) comprising an additional box (30), engageable with the basic box (10), closed by a tilting cover (40) and provided with an input connector (CE) attachable to the outlet adapter (AS) of the basic box (10) upon engagement of the additional box (30) with the basic box (10), the additional box (30) housing, on an interior, an expansion fiber (FE) having an end coupled to the input connector (CE) and an opposing end coupled to a splitter device (D) within which the expansion fiber (FE) is split into a multiplicity of user fibers (FU), each of the user fibers having an end coupled to corresponding expansion adapter (AEX) of the additional box (30), the expansion fibers located behind the tilting cover (40), and within each expansion adaptor is selectively coupled a user's drop cable (CD);
- wherein the additional box (30) further comprising a drop cable anchor module (50), engageable with two grooves (39a) provided in a lower part of the additional box (30).

17. An expandable optical distribution device, comprising:
- (1) a basic module (MB), comprising a basic box (10), closed by a front cover (20), and provided with an input (12a) and an output (12b) for an optical cable line (CO) and a connection opening (12c), the basic box (10) housing, on an interior, an optical fiber (FO) extension derived from the optical cable (CO) and a fiber (F) extension having an end spliced to the optical fiber (FO), the fiber extension also having a free end coupled to an output adapter (AS) engaged with the connection opening (12c) and to which a drop cable of a first user is selectively coupled; and
- (2) an expansion module (ME) comprising an additional box (30), engageable with the basic box (10), closed by a tilting cover (40) and provided with an input connector (CE) attachable to the outlet adapter (AS) of the basic box (10) upon engagement of the additional box (30) with the basic box (10), the additional box (30) housing, on an interior, an expansion fiber (FE) having an end coupled to the input connector (CE) and an opposing end coupled to a splitter device (D) within which the expansion fiber (FE) is split into a multiplicity of user fibers (FU), each of the user fibers having an end coupled to corresponding expansion adapter (AEX) of the additional box (30), the expansion fibers located behind the tilting cover (40), and within each expansion adaptor is selectively coupled a user's drop cable (CD);
- wherein the expansion adapters (AEX) are each assembled on a corresponding support (S), pivoted upon the additional box (30), so as to be selectively and manually moveable between a collapsed position and an assembly position, the assembly position pivoted forwardly for coupling a respective cable connector (CC) of a user's drop cable (CD).

* * * * *